Jan. 9, 1940.  J. H. ONIONS  2,186,266
SHOCK ABSORBER FOR AIRCRAFT
Filed Aug. 20, 1937  4 Sheets-Sheet 2
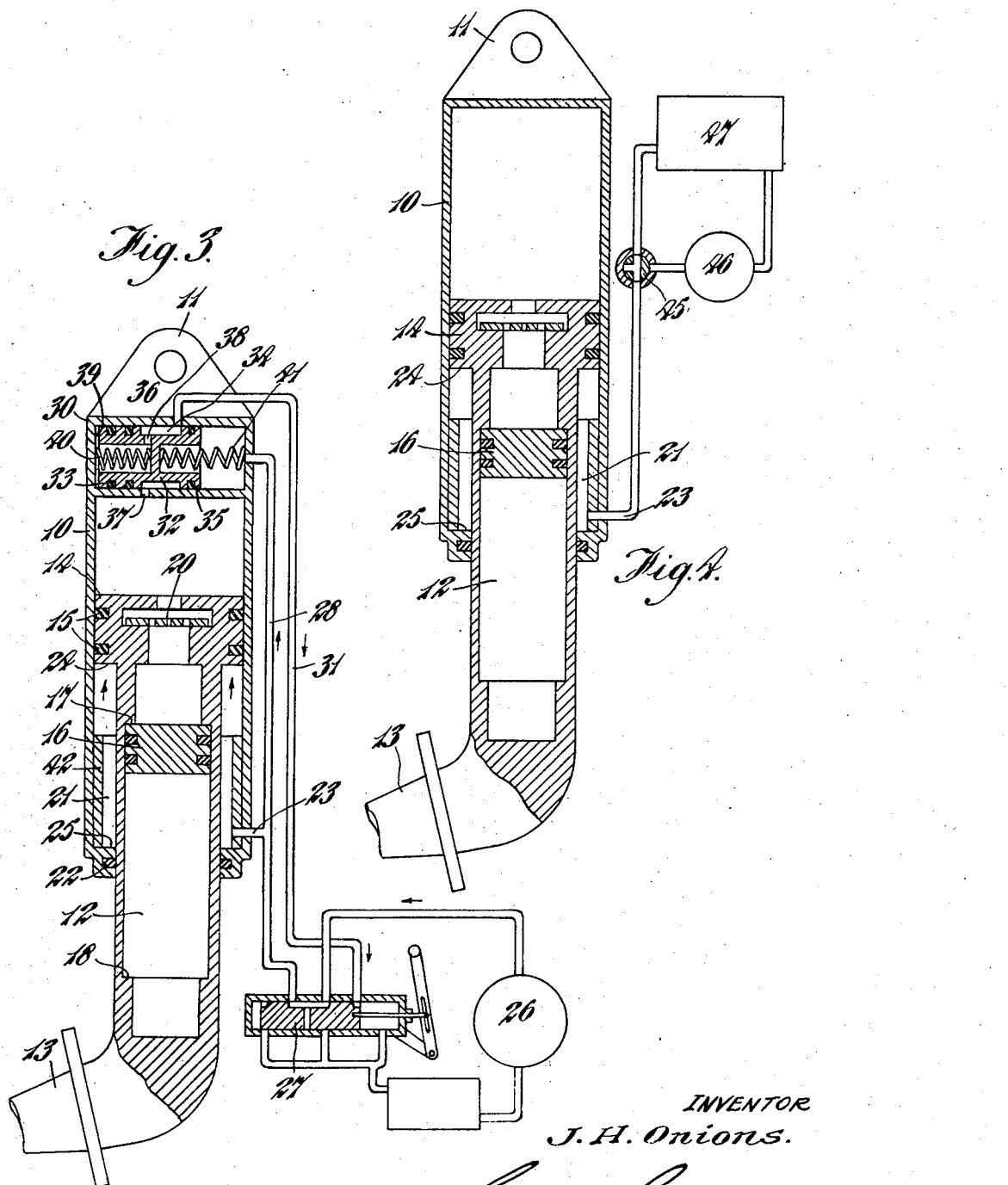
INVENTOR
J. H. Onions.
By Lacey & Lacey,
Attys

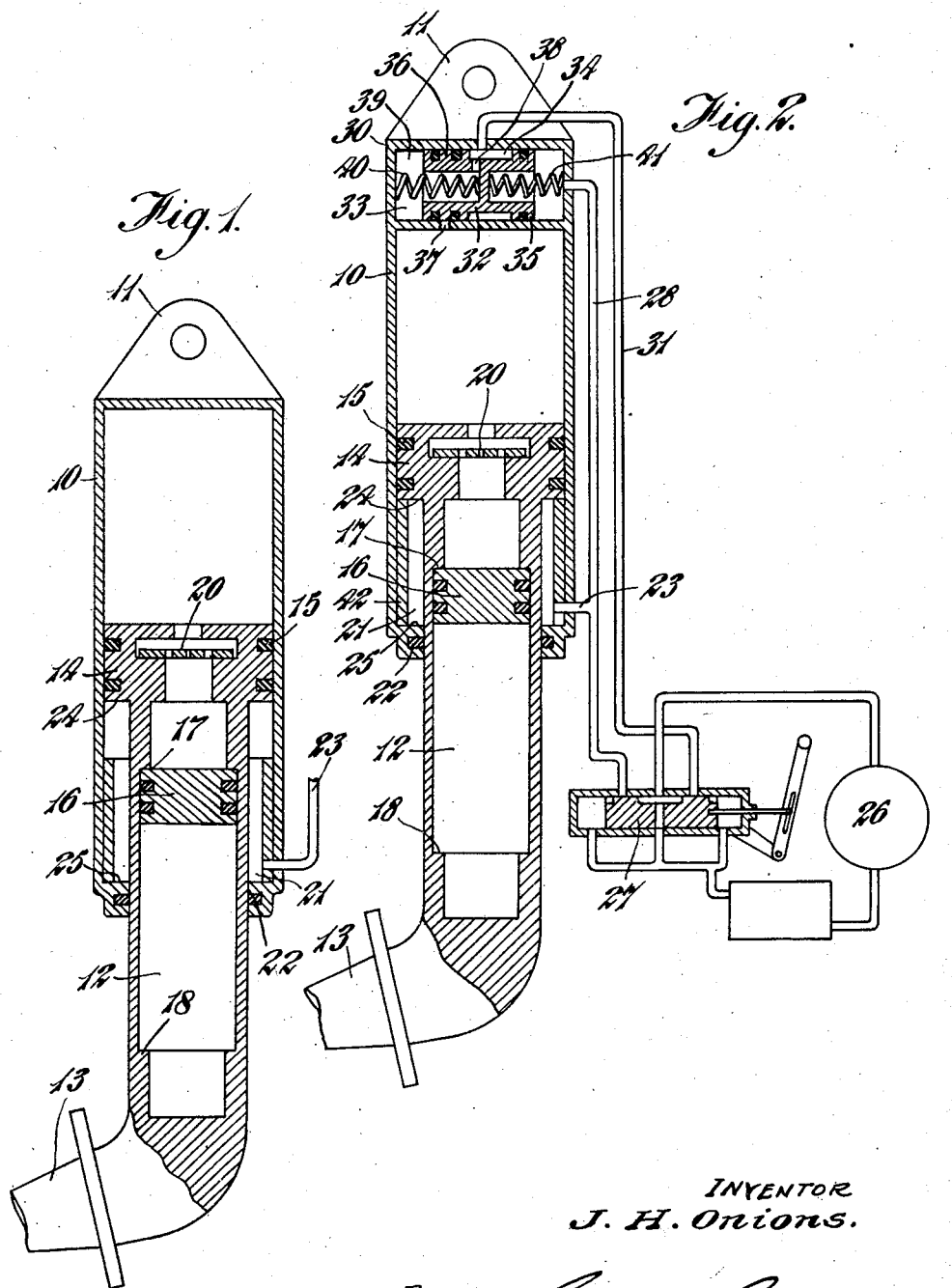

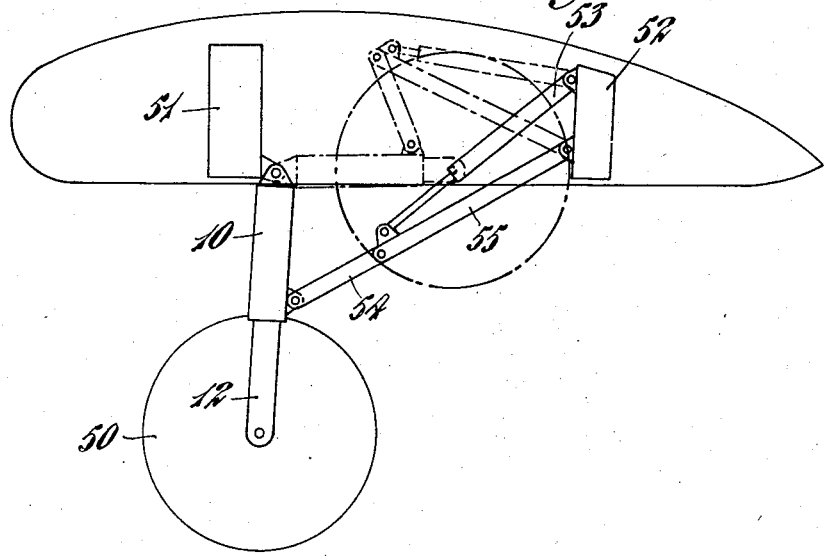
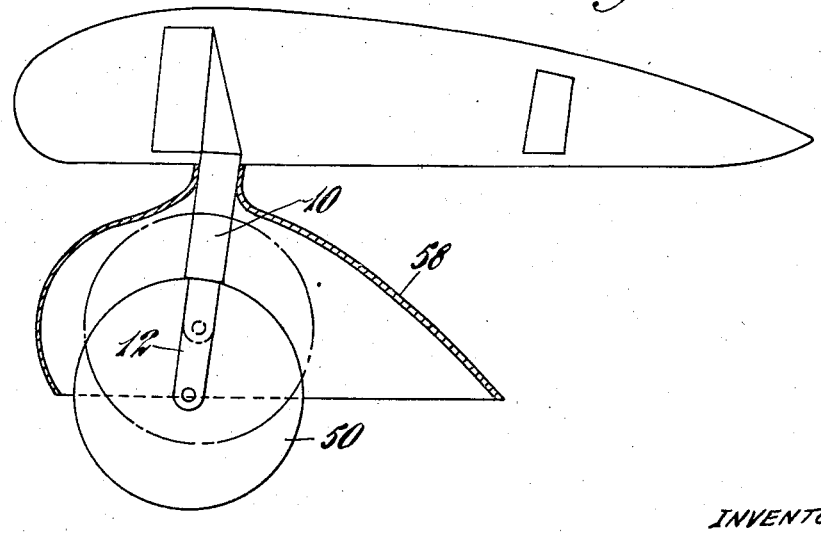

Jan. 9, 1940. J. H. ONIONS 2,186,266
SHOCK ABSORBER FOR AIRCRAFT
Filed Aug. 20, 1937 4 Sheets-Sheet 4

INVENTOR
J. H. Onions.
By Lacey & Lacey,
Attys

Patented Jan. 9, 1940

2,186,266

UNITED STATES PATENT OFFICE 2,186,266

SHOCK ABSORBER FOR AIRCRAFT

John Henry Onions, Leamington Spa, England

Application August 20, 1937, Serial No. 160,189
In Great Britain August 20, 1936

8 Claims. (Cl. 244—102)

This invention relates to shock absorbers for aircraft, and particularly to those of the kind comprising a pair of telescopically slidable tubes, containing the resilient means one of which tubes is attached to the body of the aircraft while the other carries the wheel or equivalent.

It is well known that these shock absorbers extend to their maximum length when they are carrying no axial compression load, such for example, as when the aircraft is in flight, and it is the main object of the invention to provide an improved system whereby they can be reduced in length at will so as to reduce correspondingly the aerodyramic drag of the aircraft.

A further object of the invention is to provide an improved retractable undercarriage which, in view of the fact that the shock absorbers can be shortened, folds readily into a smaller space than would be possible by the use of ordinary shock absorbers.

As a further object the invention provides an improved arrangement of undercarriage retracting gear, whereby the usual pump or other pressure-creating device is used for bringing about the shortening of the shock absorbers, the proper sequence of operations being, if desired, governed by suitable valve devices.

The invention is hereinafter described with reference to the accompanying drawings, in which:

Figure 1 is a sectional elevation of one form of oleo-pneumatic aircraft strut according to the invention;

Figure 2 is a diagram of another form of strut according to the invention, with the operating system by which it is controlled;

Figure 3 is a diagram corresponding to Figure 2. showing the strut partially shortened;

Figure 4 shows a modified form of the invention;

Figure 5 shows one application of the invention to an aircraft undercarriage;

Figure 7 shows another application of the invention.

Figure 6:
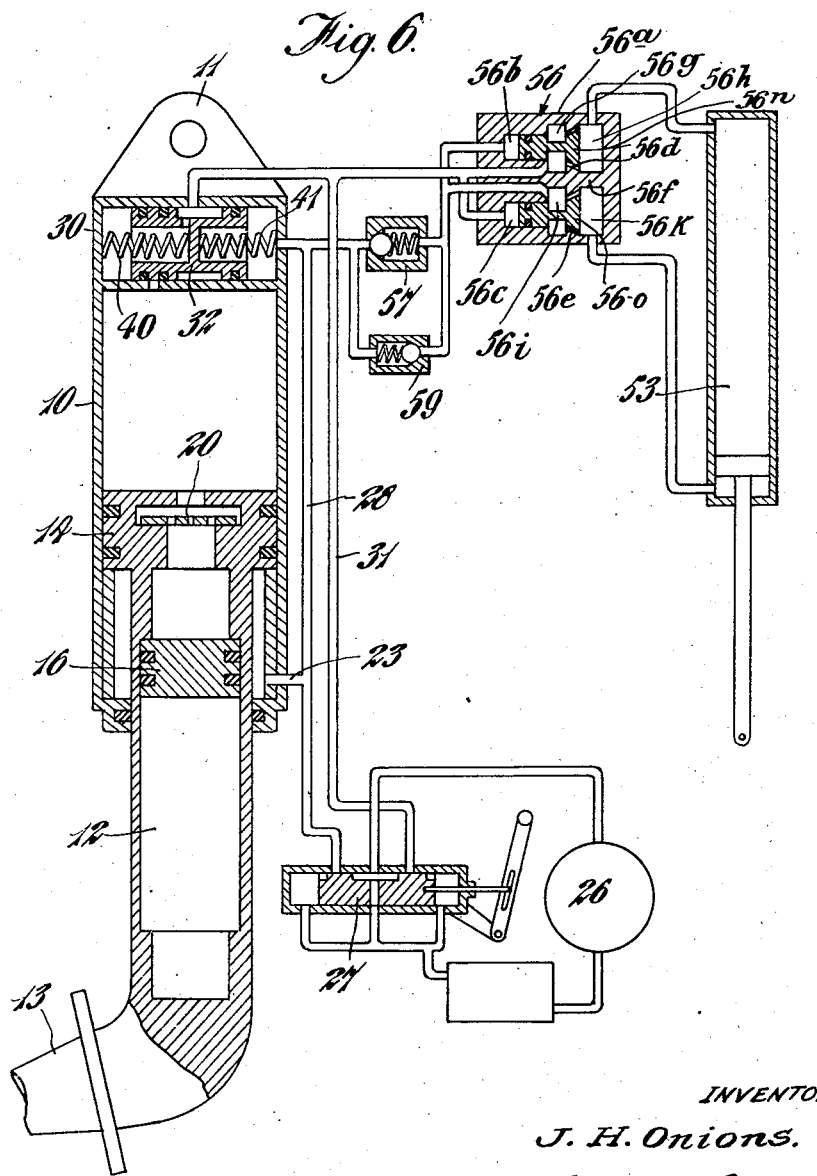
Figure 6 is a diagram of a control system for an undercarriage as shown in Figure 5; and

Referring to Figure 1, 10 is the cylinder tube of the oleo-pneumatic strut, which has a suitable fitting such as 11 for attachment to the aircraft, and 12 the plunger tube which carries a stub axle 13 to receive the wheel (not shown). The plunger tube 12 is of a diameter less than that of the cylinder tube 10, a head 14 being mounted on the plunger tube which engages with the internal wall of the cylinder tube 10, suitable packings such as 15 being provided.

The resilient element of the strut is provided by a volume of compressed air contained in the plunger tube and enclosed therein by a floating piston 16, the travel of which is limited by stops such as 17, 18.

The cylinder tube above the plunger head, and the upper part of the plunger tube are filled with liquid such as oil, the flow of which through a restricting valve 20 in the plunger head, damps the movements of the strut.

Between the lower portion of the cylinder tube 10, and the plunger tube 11 is an annular space 21, bounded at the upper end by the plunger head 14, and at the lower end by a suitable closure formed on the end of the cylinder tube, and having a packing such as 22. A pipeline 23 is connected to this space 21, through which pressure fluid from a convenient source may be admitted to the space, where it will act between the end surfaces 24 and 25, to separate them, and so shorten the strut.

The shortening of the strut will of course cause a reduction of the space containing the damping liquid, which, unless some liquid is allowed to escape, causes compression of the air in the strut. In one form of the invention, the air is so compressed, and provides an extending force to effect or assist the extension of the strut when the fluid is released from the space 21. It will be obvious that very high pressure will generally be needed to perform the shortening of the strut in this manner, since the pressure in the strut must be sufficient to withstand the normal shock loads imposed on it by the aircraft, and a pressure equal to these loads will be required to shorten the strut. In another form of the invention, liquid is permitted to escape from the strut during the shortening operation, which relieves or entirely eliminates the increase of pressure in the strut during the retracting movement.

Figures 2 and 3 show a strut together with a system for effecting its shortening and extension, Figure 2 showing the strut locked in its extended position, and Figure 3 showing it in process of being shortened.

The annular space 21 in the strut is connected by the pipe 23 to a pump 26, through a control valve 27, and a branch pipe 28 from the pipe 23 leads to a locking valve 30, indicated as being incorporated in the upper end of the strut.

A second pipe line 31 also leads from the locking valve 30 to the control valve 27, the valve being arranged to connect either pipeline 23 or 31 to the pump, whilst simultaneously connecting the other line to a reservoir.

The locking valve 30 consists of a piston 32 slidable in a bore 33. The piston has an annular groove 34 at one end of which is a narrow sealing face 35, and at the other end of which is a wide sealing face 36, the latter being arranged to control a port 37 in the wall of the bore 33, this port 37 being connected to the space in the strut containing the damping liquid. The sealing faces 35, 36 are provided with suitable packings.

The branch pipe 28 is connected to one end of the bore 33, and the pipe 31 to the side of the bore in such a manner that it is in constant communication with the groove 34, which groove is connected by a port 38 in the piston with the space 39 at the other end of the bore 33. Springs 40 and 41 locate the piston 32 when it is not under the influence of fluid pressure.

When the strut is in its extended position, the piston 32 of the valve 30 is located by the springs 40, 41, in such a position that the port 37 is obturated by the sealing face 36, and the interior of the strut is sealed so that it can perform exactly as a normal strut of similar type.

To shorten the strut, the control valve 27 is moved to the position indicated in Figure 3, causing liquid delivered by the pump 26 to flow along the pipe lines 23, 28. The pressure in the pipe 28 moves the locking valve plunger 32 to the left (as shown in the drawings), with the result that the sealing face 26 moves away from the port 37, and the interior of the strut is connected to the reservoir through port 37, annular space 34, pipeline 31, and the control valve 27.

In this case the fluid medium in the control system must be the same liquid as is used in the shock absorber for damping purposes.

Liquid entering the annular space 21 lifts the plunger 12 of the strut, forcing out the damping liquid to the reservoir and thus avoiding any rise of pressure in the strut. It will be noted that the floating piston 16 of the strut strikes the stops 17 when the strut is fully extended, and is prevented from moving beyond this point when the interior of the strut is opened, so that no pressure is exerted on the liquid in the strut by the compressed air during the shortening operation.

When the shortening operation is completed, the control valve is returned to its neutral position, and the plunger of the strut is locked in the raised position, as the control valve closes the pipeline 23, 28. Other locking means may be provided if desired.

To extend the strut, the control valve 27 is moved to the right (as seen in the drawings), causing liquid to be pumped into the pipeline 31, whilst connecting the annular space 21 to the reservoir by way of pipe 23. From the pipeline 31 the liquid enters the annular groove 34 in the locking valve piston, and passes through the port 38 to the space 39, where it acts to move the piston 32 to the right, bringing the port 37 into communication with the space 39, and allowing liquid to flow into the shock absorber to extend it.

The extension of the strut is limited by a stop sleeve 42, and on completion of the extending movement the piston 32 returns to the locking position, and the strut again is able to operate in the normal manner.

In Figure 4 is shown a strut in which the shortening operation causes compression of the air in the plunger tube, and the extension of the strut is effected by the expansion of the air when the fluid is released from the annular space 21. The fluid in the operating system may in this case be any desired liquid, or a gas.

The pipeline 23 is connected to a three-way valve 45, by means of which it may be placed in communication with a pump 46 or a reservoir 47, or may be closed off to trap fluid in the annular space 21. It will be obvious that by connecting the pipeline 23 to the pump fluid may be forced into the annular space 21, when it will raise the plunger 12, causing damping liquid from the cylinder tube 10 to pass through the plunger head and compress the air in the strut. By turning the valve 45 to the position shown in the drawings, the space 21 is placed in communication with the reservoir, and the air is enabled to expand, and extend the strut. To obtain sufficient shortening force without using very high pressures, it is necessary in this arrangement to have a considerable difference in diameter between the cylinder tube 10 and the plunger tube 12, thus giving a fairly large area upon which the shortening force acts.

Figure 5 shows an application of the invention to an aircraft undercarriage in which the wheel is retracted backwardly into the wing.

As is frequently the case in practice, the total extended length of the strut 10, 12 and the wheel 50, is greater than the distance between the front and rear wing spars 51, 52. If it is desired to arrange for backward retraction of the undercarriage, the strut must be attached forward of the front spar 51, with the result that it projects below the face of the wing even when the undercarriage is retracted.

Figure 5 shows how the present invention overcomes this difficulty, the strut being shortened sufficiently to bring the total length of the wheel and strut down to the distance between the spars 51, 52. In this figure the wheel is retracted by a jack 53 acting on a folding strut 54—55, but it will be appreciated that other methods of retraction might be employed.

Figure 6 shows a combined operating system for the shortening of the leg and the retraction of the wheel. The major part of the system is identical with that shown in Figures 2 and 3, the pipes 28 and 31 being branched to feed the jack 53 through a flow control valve 56, by means of which the jack is hydraulically locked in position when liquid is not flowing in the system. The valve 56 comprises a casing 56a having bores 56b and 56c therein. In the casing 56a there are valve seats 56d and 56e which cooperate with a partition 56f to define compartments 56g, 56h, 56i and 56k. Valve members 56l and 56m are mounted in the bores 56b and 56c and have valve heads 56n and 56o engageable, respectively, in the seats 56d and 56e. As will be seen, the heads 56n and 56o are of larger surface than their respective stems so that the pressure of fluid from the pipes 28 and 31 may, by differential pressure, force these heads from their seats.

The pipe 28, which is supplied in common with the space 21 in the strut, also feeds the lower end of the jack, through the valves 57 and 56, to move it in the direction for retracting the undercarriage. The branch from the pipe 31 leads to the upper end of the jack. Movement of the control valve in one direction therefore causes shortening of the strut and retraction of the undercarriage, and movement in the other direction causes lowering of the undercarriage and extension of the strut.

Means are preferably provided for effecting the two parts of each of the retracting and the lowering operations in sequence, the strut being shortened before the undercarriage is retracted, and extended after the undercarriage is lowered. The correct sequence of the former operations may be ensured by the incorporation of a restriction valve 57 which is so loaded that no fluid is supplied to the jack until the strut is fully shortened, the loading of the valve being greater than the pressure needed to raise the plunger and wheel. The sequence of the lowering operations may be ensured by making the spring 41 of such strength that the valve piston 32 cannot be moved over to admit liquid to the strut until the jack is at least partially extended. A lightly loaded check valve 59 is connected across the valve 58, as shown in Fig. 6, in order to allow liquid to be discharged from the lower compartment of the jack during extending movement thereof.

A series of interlocking valves may alternatively be provided for controlling the sequence of the operations, the completion of the shortening movement of the strut operating a valve admitting pressure liquid to the jack during the retract-operation, whilst the completion of the extending movement operates a valve to admit fluid to the strut during the lowering operation.

Figure 7 shows another application of the shortening strut, in this case to a non-retracting cantilever type of undercarriage.

The cylinder tube 10 of the strut carries a fairing 58, having sufficient ground clearance to avoid the necessity of being able to move with the wheel as the shock absorber yields. The plunger tube 12 of the strut is retractable by the method according to the invention, whereby the wheel 50 may be lifted during flight completely within the fairing 58, thus reducing the drag of the undercarriage structure, and at the same time enabling the fairing to be secured rigidly to the aircraft structure instead of being mounted to reciprocate with the plunger tube of the strut.

The pump referred to in any of the various arrangements described above may be a hand or mechanically operated pump of any desired type. If a mechanically operated pump is used, it may be driven electrically or direct from the aircraft engine and may be supplemented by an auxiliary hand pump, the actuating element of which may, if desired, serve also as the control for the delivery of the mechanical pump.

Although the invention has been described as applied to an oleo-pneumatic strut, it may equally well be applied to a strut in which the compressed air is replaced by a spring or other resilient element, and, in certain forms, may also be applied to pneumatic or spring struts having no damping liquid, in fact to any form of shock absorber having two elements whose overall length is shortened against the force exerted by resilient element to provide the shock absorbing effect.

Further it is contemplated that other means besides liquid pressure may be used for bringing about the shortening of the shock absorber, said means being for example mechanical or gas pressure. In this connection it will of course be clear that the shortening may take place under the action of atmospheric pressure, a pump or other device being used to create a partial vacuum within the cylinder member of the shock absorber.

The shortening of the strut may be advantageous in numerous forms of retractable undercarriage other than the type specifically described herein. Thus, in an undercarriage which retracts in a sideways direction there may be only a limited space available for the retracted wheels, and by the use of the invention, the undercarriage may be retracted into a space which would otherwise be too small to receive it.

What I claim is:

1. In an aircraft undercarriage, a shock absorber comprising a cylinder and a plunger slidable in the cylinder, one end of the cylinder being apertured for the passage of the plunger, resilient means in the plunger and providing shock absorbing means for the undercarriage, means for supplying liquid to and removing liquid from the space between the cylinder and the plunger both above and below said plunger to shorten or increase the length of the shock absorber without affecting the resilient means, a locking valve, and automatic means for urging said locking valve to a position for preventing the flow of liquid into or out of the shock absorber, said locking valve being movable against said automatic means only by the pressure of liquid supplied to effect a change of length of the shock absorber.

2. In an aircraft undercarriage, a shock absorber comprising a cylinder and a plunger slidable in the cylinder, one end of the cylinder being apertured for the passage of the plunger, resilient means within the plunger member for providing shock absorbing means for the undercarriage, means for supplying liquid to and removing liquid from the space between the cylinder and the plunger both above and below said plunger to shorten or increase the length of the shock absorber without affecting the resilient means, a locking valve, and automatic means for urging said locking valve to a position for preventing the flow of liquid into or out of the shock absorber, said locking valve being movable against said automatic means only by the pressure of liquid supplied to effect a change of length of the shock absorber.

3. In an aircraft undercarriage, a shock absorber comprising a cylinder member and a plunger member slidable in the cylinder member, one end of the cylinder member being apertured for the passage of the plunger member, resilient means in the plunger member for providing shock absorbing means for the undercarriage, means for supplying liquid to and removing liquid from the space between the cylinder member and the plunger member both above and below said plunger member to shorten or increase the length of the shock absorber without affecting the resilient means, a valve chamber mounted on said cylinder member, a port connecting the valve chamber to the interior of the cylinder member, a locking valve controlling said port, and automatic means for urging said locking valve into position to close said port, said locking valve being movable against said automatic means by the pressure of liquid supplied to effect a change of length of the shock absorber.

4. In an aircraft undercarriage, a shock absorber comprising a cylinder and a plunger slidable in the cylinder, one end of the cylinder being apertured for the passage of the plunger, resilient means in the plunger for providing shock absorbing means for the undercarriage, a pump for supplying liquid to either of the spaces into which the cylinder is divided by the plunger to modify the length of the shock absorber without affecting the resilient means, a control valve to direct the liquid from the pump to one or the other of the spaces in the shock absorber, and a locking valve controlling the escape of liquid from the space between the plunger and the closed end of the cylinder, the locking valve comprising a housing, a piston movable in the housing, a port in said housing leading to the cylinder space, biasing means acting on said piston to locate it in a position to obturate connections to said housing from the control valve, said valve piston being movable against its biasing means only by liquid delivered by the pump through the control valve to effect a change of length of the shock absorber.

5. In an aircraft undercarriage, a shock absorber comprising a cylinder and a plunger slidable in the cylinder, one end of the cylinder being apertured for the passage of the plunger, resilient means in the plunger for providing shock absorbing means for the undercarriage, a pump for supplying liquid to either of the spaces into which the cylinder is divided by the plunger to modify the length of the shock absorber without affecting the resilient means, a control valve to direct the liquid from the pump to one or the other of the spaces in the shock absorber, and a locking valve controlling the escape of liquid from the space between the plunger member and the upper end of the cylinder, the locking valve comprising a housing, a piston movable in said housing, a port in the housing leading to said cylinder space, springs acting on the ends of said piston to bias it toward a central position in which it obturates said port, and connections to said housing from the control valve admitting liquid to opposite ends of said piston, liquid admitted at one end of said piston causing it to move in one direction to admit said liquid to the shock absorber and liquid admitted at the other end of said piston causing it to move in the other direction to allow liquid to escape from the shock absorber to permit shortening thereof.

6. In an aircraft undercarriage, a shock absorber comprising a cylinder and a plunger slidable therein, one end of the cylinder being apertured for the passage of the plunger, resilient means in the plunger and defining shock absorbing means, a pivotal mounting for the shock absorber on the aircraft, bracing means for the shock absorber, a liquid pressure operated jack acting on said bracing means to effect retraction of the undercarriage, means for supplying liquid under pressure to said jack and to either of the spaces into which the cylinder of the shock absorber is divided by the plunger whereby the shock absorber is shortened when the undercarriage is retracted and extended when the undercarriage is extended, and a locking valve for controlling flow of liquid into and out of said shock absorber, biasing means being provided for urging said locking valve to a position for preventing flow of liquid into or out of the shock absorber, the locking valve being movable against said biasing means by the pressure of liquid supplied to effect a change of length of the shock absorber.

7. In an aircraft undercarriage, a shock absorber comprising a cylinder and a plunger slidable therein, one end of the cylinder being apertured for the passage of the plunger, resilient means in the plunger and defining shock absorbing means for the undercarriage, a pivotal mounting for the shock absorber on the aircraft, bracing means for the shock absorber, a liquid pressure operated jack acting on said bracing means to effect retraction of the undercarriage, means for supplying liquid under pressure to said jack and to either of the spaces into which the cylinder member of the shock absorber is divided by the plunger whereby the shock absorber is shortened when the undercarriage is retracted and extended when the undercarriage is extended, means for causing the liquid to act in the shock absorber before acting in the jack when raising the undercarriage, and for causing the liquid to act in the jack before acting in the shock absorber when lowering the undercarriage, and a locking valve for controlling the flow of liquid into and out of said shock absorber, biasing means being provided for urging said locking valve to a position for preventing the flow of liquid into or out of the shock absorber, the locking valve being movable against said biasing means only by the pressure of liquid supplied to effect a change of length of the shock absorber.

8. In an aircraft undercarriage, a shock absorber comprising a cylinder and a plunger slidable therein, one end of the cylinder being apertured for the passage of the plunger, resilient means in the plunger and defining shock absorbing means for the undercarriage, a pivotal mounting for the shock absorber on the aircraft, bracing means for the shock absorber, a liquid pressure operated jack acting on said bracing means, means for supplying liquid under pressure to one end of said jack to retract the undercarriage and to the other end of said jack to extend the undercarriage, said means also supplying liquid to the spaces into which the cylinder is divided by the plunger, said spaces being connected to the liquid supplying means one in common with each end space of the jack, a restriction in the connection to the end of the jack fed in common with the other end of the shock absorber whereby the shock absorber is automatically shortened prior to retraction of the undercarriage, and automatically lengthened subsequent to extension of the undercarriage, and a locking valve for controlling the flow of liquid into and out of said shock absorber, biasing means being provided for urging said locking valve to a position for preventing the flow of liquid into or out of the shock absorber, the locking valve being movable against said biasing means by the pressure of liquid supplied to effect a change of length of the shock absorber.

JOHN HENRY ONIONS.